US010533297B2

(12) United States Patent
Kim

(10) Patent No.: US 10,533,297 B2
(45) Date of Patent: Jan. 14, 2020

(54) CAISSON BLOCK CONSTRUCTION METHOD AND CAISSON BLOCK STRUCTURE

(71) Applicant: YUJOO CO., LTD., Busan (KR)

(72) Inventor: Sang Gi Kim, Busan (KR)

(73) Assignee: YUJOO CO., LTD., Busan (KR)

( * ) Notice: Subject to any disclaimer, the term of this patent is extended or adjusted under 35 U.S.C. 154(b) by 0 days.

(21) Appl. No.: 16/327,113

(22) PCT Filed: Sep. 8, 2016

(86) PCT No.: PCT/KR2016/010058
§ 371 (c)(1),
(2) Date: Feb. 21, 2019

(87) PCT Pub. No.: WO2018/038305
PCT Pub. Date: Mar. 1, 2018

(65) Prior Publication Data
US 2019/0218740 A1 Jul. 18, 2019

(30) Foreign Application Priority Data
Aug. 24, 2016 (KR) .................. 10-2016-0107522

(51) Int. Cl.
*E02D 23/08* (2006.01)
*E02B 3/06* (2006.01)
(Continued)

(52) U.S. Cl.
CPC ............... *E02D 23/00* (2013.01); *E02B 3/06* (2013.01); *E02D 5/20* (2013.01); *E02D 23/02* (2013.01);
(Continued)

(58) Field of Classification Search
CPC .......... E02D 5/20; E02D 23/00; E02D 23/08; E02D 23/16; E02D 27/18; E02D 27/20; E02B 3/06; E02B 3/066
(Continued)

(56) References Cited

U.S. PATENT DOCUMENTS 3,431,734 A * 3/1969 Vattuone .................. E02B 3/06
405/33
4,175,888 A * 11/1979 Ijima ....................... E02B 3/06
405/31
(Continued)

FOREIGN PATENT DOCUMENTS

KR 10-2007-0090733 A 9/2007
KR 10-2011-0002998 A 1/2011
(Continued)

OTHER PUBLICATIONS

International Search Report for PCT/KR2016/010058 dated May 2, 2017 from Korean Intellectual Property Office.

*Primary Examiner* — Frederick L Lagman
(74) *Attorney, Agent, or Firm* — Paratus Law Group, PLLC

(57) ABSTRACT

A caisson block construction method, including: manufacturing a plurality of bottom caisson blocks having a plurality of first unit compartments disposed consecutively in a horizontal direction; manufacturing a plurality of upper caisson blocks having a plurality of second unit compartments; forming a bottom caisson block structure by installing the plurality of bottom caisson blocks side by side in the horizontal direction; installing the plurality of upper caisson blocks above the installed bottom caisson blocks; filling with rubble the second unit compartment of the upper caisson block positioned above the first unit compartment for rubble and exposed upward; inserting a vertical reinforcing bar module after the upper caisson blocks are
(Continued)

installed; and forming a vertical concrete column for joining by casting concrete into the upper part of the second unit compartment in which the vertical reinforcing bar module is inserted.

5 Claims, 13 Drawing Sheets

(51) Int. Cl.
    *E02D 5/20*     (2006.01)
    *E02D 23/00*     (2006.01)
    *E02D 25/00*     (2006.01)
    *E02D 23/02*     (2006.01)

(52) U.S. Cl.
    CPC ............ *E02D 23/08* (2013.01); *E02D 25/00* (2013.01); *E02D 2250/0023* (2013.01); *E02D 2300/002* (2013.01); *E02D 2300/0079* (2013.01); *E02D 2600/40* (2013.01)

(58) Field of Classification Search
    USPC .......................... 405/16, 17, 21, 25, 31, 33
    See application file for complete search history.

(56) References Cited

U.S. PATENT DOCUMENTS

| | | | | |
|---|---|---|---|---|
| 4,661,014 A | * | 4/1987 | Aubert | E02B 3/04 405/111 |
| 4,764,052 A | * | 8/1988 | Jarlan | E02B 3/06 405/31 |
| 5,087,150 A | * | 2/1992 | McCreary | E02B 3/06 405/31 |
| 5,129,756 A | * | 7/1992 | Wheeler | E02B 3/06 405/211 |
| 6,491,473 B2 | * | 12/2002 | Veazey | B63B 3/04 405/16 |
| 2002/0098041 A1 | * | 7/2002 | Chang | E02B 3/06 405/21 |
| 2003/0138296 A1 | * | 7/2003 | O'Hare | E02B 3/06 405/25 |
| 2003/0140840 A1 | * | 7/2003 | Yang | E02B 3/066 114/382 |
| 2005/0207844 A1 | * | 9/2005 | Boccotti | F03B 13/142 405/21 |
| 2008/0089743 A1 | * | 4/2008 | Han | E02B 3/04 405/18 |
| 2014/0183122 A1 | * | 7/2014 | Canals | E02B 9/08 210/251 |

FOREIGN PATENT DOCUMENTS

| | | |
|---|---|---|
| KR | 10-1220995 B1 | 1/2013 |
| KR | 10-2013-0093878 A | 8/2013 |
| KR | 10-1355805 B1 | 1/2014 |
| KR | 10-2014-0057049 A | 5/2014 |
| KR | 10-2014-0144415 A | 12/2014 |

* cited by examiner

CAISSON BLOCK CONSTRUCTION METHOD AND CAISSON BLOCK STRUCTURE

CROSS REFERENCE TO PRIOR APPLICATIONS

This application is a National Stage Patent Application of PCT International Patent Application No. PCT/KR2016/010058 (filed on Sep. 8, 2016) under 35 U.S.C. § 371, which claims priority to Korean Patent Application No. 10-2016-0107522 (filed on Aug. 24, 2016), which are all hereby incorporated by reference in their entirety.

BACKGROUND

The present invention relates to a caisson block construction method and a caisson block structure and, more particularly, to a caisson block construction method for forming a caisson block structure and the caisson block structure.

A port is a facility equipped for entering and unloading of ships, landing and leaving of passengers, loading, storing, and managing of cargo, and in order to perform this function smoothly, port calmness should be ensured. Breakwater facilities are necessary for ensuring the port calmness, and quay facilities for berthing are necessary for the loading of cargo and the landing and leaving of passengers. The above-mentioned facilities are collectively referred to as a dissipating structure.

As FIG. 25 shows a conventional breakwater and, more particularly, an inclined type breakwater formed by constructing rubble mound on the sea floor and covering the inclined rubble mound with riprap protection or other dissipating blocks. The conventional breakwater is easily damaged by large wave power, which is problematic.

Meanwhile, FIGS. 26 and 27 are perspective views showing a conventional quay caisson and a plane view showing a quay using the conventional quay caisson. Particularly, a base layer of rubble, etc. is formed on foundation, a plurality of caissons are installed thereon, and then each caisson is filled with rubble to ensure stability of a caisson structure. As the caisson structure has a large resistance to earth pressure, the caisson structure can allow the berthing of ships to be easy and endure large wave.

However, in a case of a method for constructing the breakwater using the conventional caisson, a size of the caisson increases to ensure weight of the caisson. Therefore, it is difficult to transport the caisson and to secure a site for manufacturing and placing the caisson in order to use the method.

In order to solve the problem the method using caissons described above, a method for constructing a caisson structure by piling small caisson blocks in multiple levels according to water levels is known.

However, when the caisson structure is formed of the small caisson blocks, a coupling structure between the small caisson blocks is weak and it is difficult to ensure durability similar to a case of using large caisson blocks, and it is difficult to accurately place each small caisson block to be aligned to another small caisson block in the water.

Particularly, when a position of the small caisson block is shifted, it has negative effect on durability of the caisson structure. Therefore, it is very important to accurately install the small caisson block in a precise position.

However, it is difficult to align the small caisson block to its precise position and to place the small caisson block in the water.

A diver should inform a crane operator of the accurate position of the small caisson block from the water, but it is difficult for the diver to recognize the accurate position of the small caisson block because of lack of visibility in the water. Moreover, although the diver recognizes the accurate position of the small caisson block, it is difficult to accurately inform the crane operator of positional information.

SUMMARY

Accordingly, the present invention has been made keeping in mind the above problems occurring in the prior art, and an object of the present invention is to provide a caisson block construction method for forming a durable structure by disposing a plurality of caisson blocks offset from each other and coupling the plurality of caisson blocks by filling with rubble and a vertical concrete column for joining, and to provide a caisson block structure constructed using the method.

In order to accomplish the above object, the present invention provides a caisson block construction method, the method including: manufacturing a plurality of bottom caisson blocks having a plurality of first unit compartments disposed consecutively in a horizontal direction, each of the first unit compartments being classified into a first unit compartment for rubble and having an open upper part and a closed lower part and a first unit compartment for concrete, wherein an upper part of the first unit compartment for concrete is open; manufacturing a plurality of upper caisson blocks having a plurality of second unit compartments, each of the second unit compartments being disposed consecutively in the horizontal direction and having open upper and open lower parts; forming a bottom caisson block structure by installing the plurality of bottom caisson blocks side by side in the horizontal direction; installing the plurality of upper caisson blocks above the installed bottom caisson blocks, by installing the upper caisson blocks such that each of the upper caisson blocks is horizontally offset from the bottom caisson block or the upper caisson block which is installed below the upper caisson block to be installed, and each of the second unit compartments of the upper caisson block is disposed directly above the first unit compartment of the bottom caisson block or the second unit compartment of the upper caisson block which is installed below the upper caisson block to be installed; filling with rubble the second unit compartment of the upper caisson block positioned above the first unit compartment for rubble and exposed upward, so that the rubble fills vertically from the first unit compartment for rubble to the second unit compartment of the upper caisson block exposed upward, after the upper caisson blocks are installed; inserting a vertical reinforcing bar module after the upper caisson blocks are installed, by inserting the vertical reinforcing bar module being which is formed vertically and covered by a waterproof membrane on lower and side parts thereof into the upper part of the second unit compartment of the upper caisson block, which is positioned above the first unit compartment for concrete and exposed upward, so that the vertical reinforcing bar module is positioned inside the first unit compartment for concrete and at least one second unit compartment disposed consecutively; and forming a vertical concrete column for joining by casting concrete into the upper part of the second unit compartment in which the vertical reinforcing bar module is inserted, so that the vertical concrete column for joining is formed consecutively along the first unit compartment for concrete and at least one second unit compartment disposed consecutively.

Preferably, the first unit compartment for concrete of the bottom caisson block may have an open lower part.

Preferably, the installing the upper caisson blocks further may include: preparing an installation guide member, the installation guide member including an installation guide pole provided with a guide body having a cross-sectional shape corresponding to the second unit compartment and extended in the vertical direction, a cap formed on an upper part of the guide body and having a stopping step protruding from a rim of the cap, and an insertion guide part formed on a lower part and having a cross-sectional area decreasing gradually along a downward direction; after the installation guide pole is inserted in the second unit compartment of the upper caisson block subject to be installed and the upper caisson block subject to be installed is lifted, placing the upper caisson block subject to be installed on the bottom caisson block or the upper caisson block which is installed below the upper caisson block subject to be installed, by inserting the insertion guide part of the installation guide pole into the first unit compartment of the bottom caisson block or the second unit compartment of the upper caisson block which is installed below the upper caisson block subject to be installed, so that the second unit compartment of the upper caisson block subject to be installed is positioned directly above the first unit compartment of the bottom caisson block or the second unit compartment of the upper caisson block which is installed below the upper caisson block subject to be installed, with being guided by the installation guide pole; and after the upper caisson block subject to be installed is placed, separating and recovering the installation guide member from the upper caisson block subject to be installed, wherein the placing the upper caisson block and the separating and recovering the installation guide member may be repeated a plurality of times.

Preferably, wherein the installation guide member may include a plurality of the installation guide poles and a horizontal spacer from which the plurality of installation guide poles are suspended while maintaining horizontal spacing therebetween, and a center-to-center length of first unit compartments for concrete adjacent to each other in the bottom caisson block is twice a length from a side surface of the bottom caisson block to a center of a first unit compartment for concrete horizontally adjacent to the side surface of the bottom caisson block.

As another aspect of the present invention, a caisson block structure constructed by the caisson block construction method is provided.

As described above, the present invention provides the caisson block construction method for forming a durable structure by disposing a plurality of caisson blocks offset from each other and coupling the plurality of caisson blocks by filling with rubble and a vertical concrete column for joining, and the caisson block structure constructed using the method.

DETAILED DESCRIPTION

Figure 1:
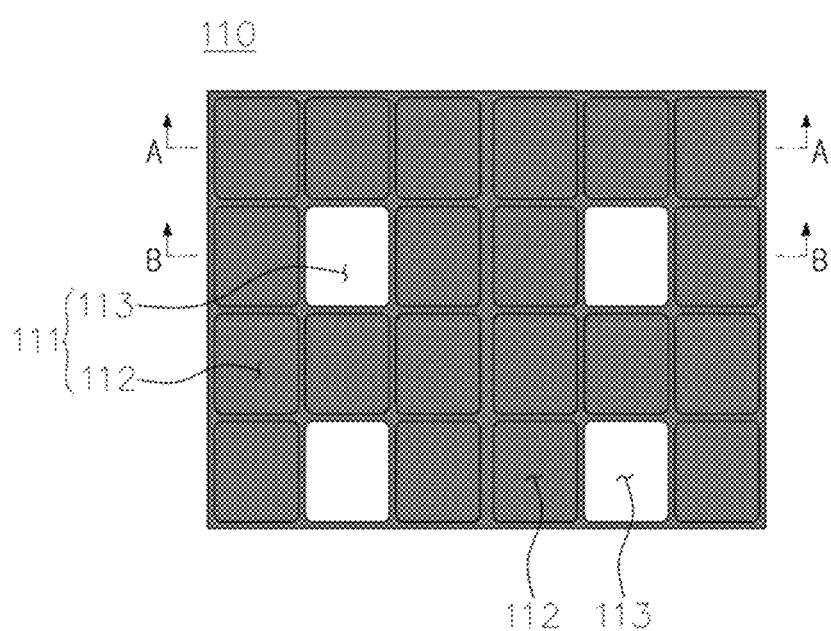
FIG. 1 is a plan view showing a bottom caisson block constructed according to an embodiment of the present invention.

Hereinbelow, exemplary embodiments of the present invention will be described in detail with reference to the accompanying drawings such that the invention can be easily embodied by one of ordinary skill in the art to which the present invention belongs. However, the present invention may be embodied variously and is not limited to the embodiment described hereinbelow. Throughout the drawings, components incorporated herein will be omitted when it may make the subject matter of the present invention unclear, the same reference numerals will refer to the same or like parts.

Unless the context clearly indicates otherwise, it will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof.

1. Manufacturing Bottom Caisson Block and Upper Caisson Block

First, a bottom caisson block 110 manufactured according to an embodiment will be described.

Figure 2:
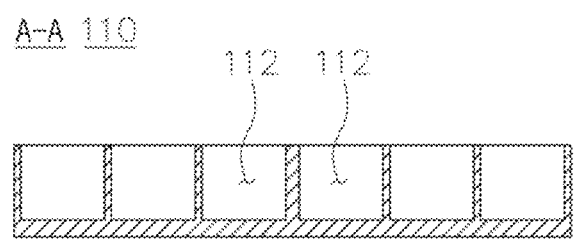
FIG. 2 is a sectional view taken along the A-A line of FIG. 1.
Figure 3:
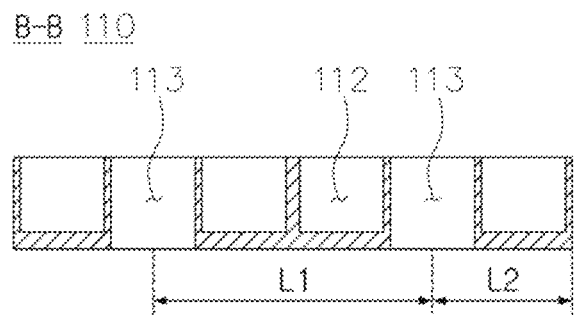
FIG. 3 is a sectional view taken along the B-B line of FIG. 1.
Figure 4:
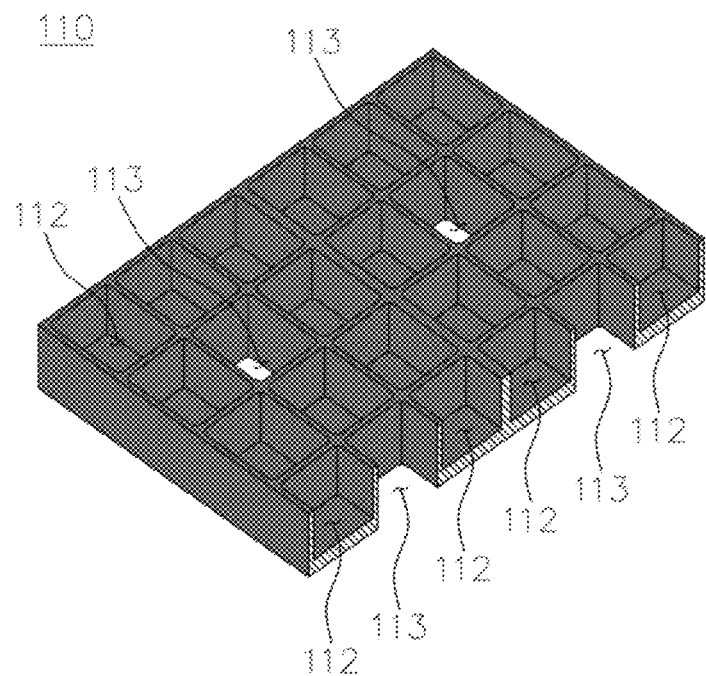
FIG. 4 is a partially-cut perspective view of FIG. 1.

FIG. 1 is a plan view showing a bottom caisson block constructed according to an embodiment of the present invention. FIG. 2 is a sectional view taken along the A-A line of FIG. 1. FIG. 3 is a sectional view taken along the B-B line of FIG. 1. FIG. 4 is a partially-cut perspective view of FIG. 1.

The bottom caisson block 110 has a plurality of first unit compartments 111 disposed consecutively in a horizontal direction.

In the embodiment of the present invention, the bottom caisson block 110 is provided with 24 (6×4) first unit compartments 111 disposed consecutively in the horizontal direction.

The first unit compartments 111 are classified into a first unit compartment for rubble 112 and a first unit compartment for concrete 113.

The first unit compartment for rubble 112 has an open upper part and a closed lower part. Most of the first unit compartments 111 correspond to the first unit compartment for rubble 112, and the bottom caisson block 110 of the embodiment is provided with first unit compartments for rubble 112.

The first unit compartment for concrete 113 has open upper and open lower parts, and the bottom caisson block 110 of the embodiment is provided with 4 first unit compartments for concrete 113.

In case of the embodiment, the first unit compartment for concrete 113 has the open lower part, but depending on embodiments, the first unit compartment for concrete 113 may have a closed lower part like the first unit compartment for rubble 112.

However, when the first unit compartment for concrete 113 has the open lower part, as will be described in inserting a vertical reinforcing bar module, water inside and above the first unit compartment for concrete 113 can be easily discharged through an open lower part of the first unit compartment for concrete 113, so that the vertical reinforcing bar module covered by a waterproof membrane can be easily inserted, which is advantageous.

The first unit compartment for concrete 113 is extended in the vertical direction, and some first unit compartments for concrete 113 function to guide an upper caisson block 120 to be seated on an accurate position.

In the embodiment, all bottom caisson blocks 110 have the first unit compartments for rubble and concrete 112 and 113, respectively. In addition, cross-sectional shapes of the first unit compartments for rubble and concrete 112 and 113 are all the same.

In addition, a center-to-center length (L1) of first unit compartments for concrete 113 adjacent to each other in one bottom caisson block 110 is twice a length (L2) from a first side surface of the bottom caisson block 110 to a center of a first unit compartment for concrete 113 adjacent to the first side surface of the bottom caisson block 110 (referring to FIG. 3).

In addition, in the embodiment, it is assumed that the bottom caisson block having the same shape is installed. However, this is only for convenience of description, and a bottom caisson block having another shape may be installed according to the technical concept of the present invention.

Meanwhile, the bottom caisson block 110 has a separate means for lifting the bottom caisson block.

The present inventor proposed Korean Patent No. 10-1220995 as a technique for lifting and placing a concrete block using a through tube for passing a wire rope, and the through tube for passing the wire rope may be applied to the bottom caisson block of the present invention. In the point of a view described above, Korean Patent No. 10-1220995 is considered to be integrated in the description.

In addition, depending on embodiments, in order to lifting and placing the bottom caisson block, a lifting loop means proposed as a conventional technique in Korean Patent No. 10-1220995 may be provided instead of the through tube for passing the wire rope.

As described above, various methods may be applied to the lifting means provided in the bottom caisson block, and detailed description thereof will be omitted.

Next, an upper caisson block 120 manufactured according to the embodiment will be described.

Figure 5:
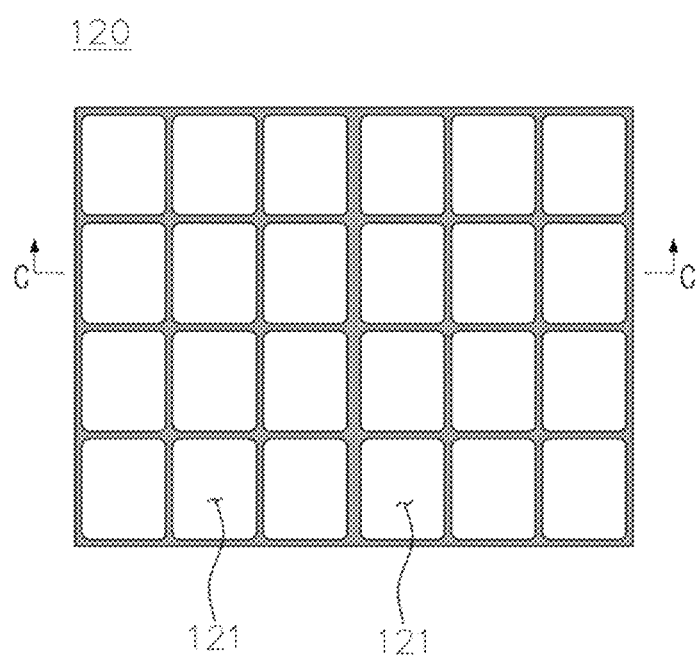
FIG. 5 is a plan view showing an upper caisson block constructed according to the embodiment of the present invention.
Figure 6:
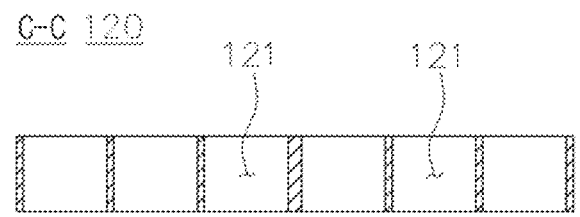
FIG. 6 is a sectional view taken along the C-C line of FIG. 5.
Figure 7:
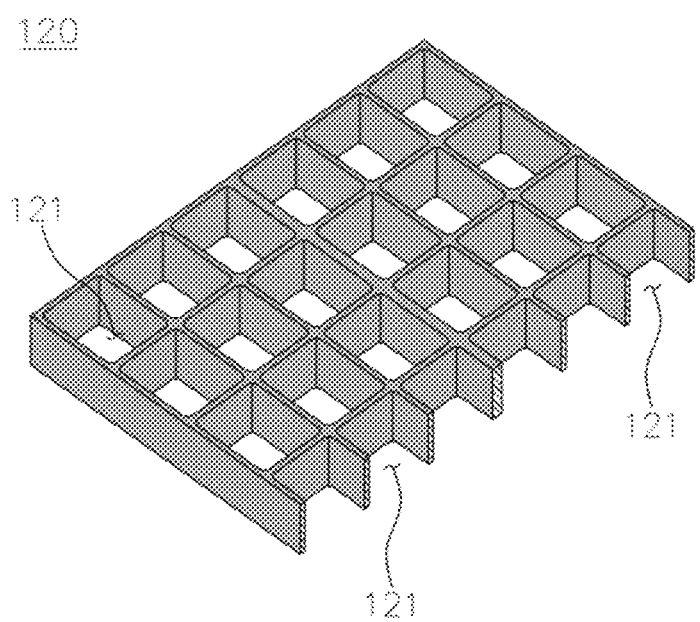
FIG. 7 is a partially-cut perspective view showing the upper caisson block of FIG. 5.

FIG. 5 is a plan view showing an upper caisson block constructed according to the embodiment of the present invention. FIG. 6 is a sectional view taken along the C-C line of FIG. 5. FIG. 7 is a partially-cut perspective view showing the upper caisson block of FIG. 5.

The upper caisson block 120 has a plurality of second unit compartments 121 disposed consecutively in the horizontal direction.

In the embodiment, the upper caisson block 120 is provided with 24 (6×4) second unit compartments 121 disposed consecutively in the horizontal direction.

Each of second unit compartments 121 has open upper and open lower parts.

The second unit compartment 121 is extended in the vertical direction, and some of the second unit compartments 121 function to guide an upper caisson block 120 to be seated on an accurate position.

In the embodiment, all upper caisson blocks 120 respectively have the second unit compartments 121 each having open upper and open lower parts, and cross-sectional shapes of the second unit compartments are all the same.

In addition, the upper caisson block 120 is provided with the separate means for lifting the upper caisson block. This is replaced by the description of the bottom caisson block 110.

2. Preparing Installation Guide Member

An installation guide member 200 according to the embodiment will be described.

Figure 8:
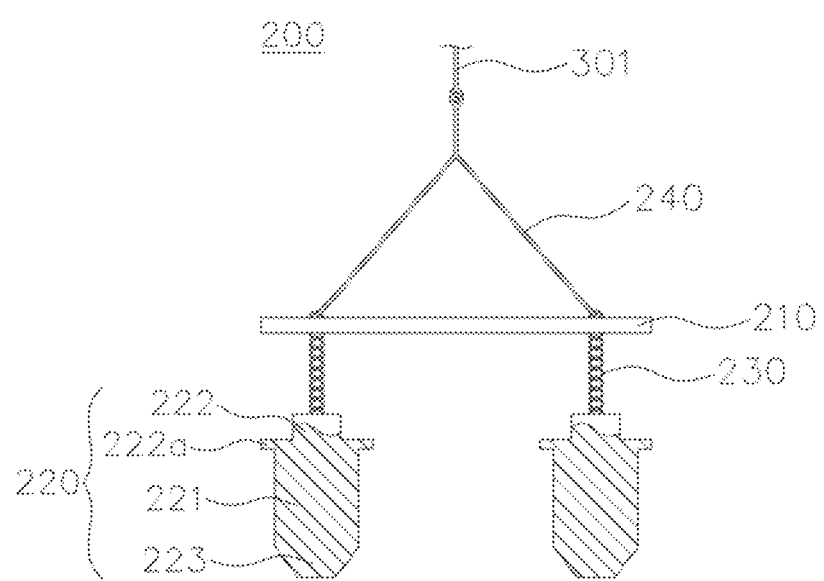
FIG. 8 is a front view showing an installation guide member according to the embodiment of the present invention.
Figure 9:
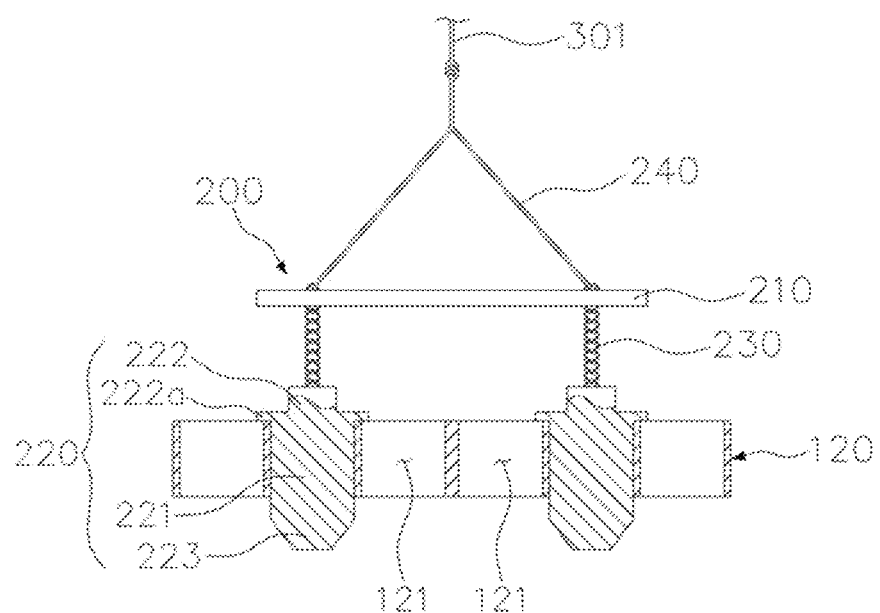
FIG. 9 is a sectional view conceptually showing the installation guide member of FIG. 8 installed in the upper caisson block of FIG. 5.

FIG. 8 is a front view showing an installation guide member according to the embodiment of the present invention. FIG. 9 is a sectional view conceptually showing the installation guide member of FIG. 8 installed in the upper caisson block of FIG. 5.

The installation guide member 200 includes a horizontal spacer 210 and a plurality of installation guide poles suspended from both ends of the horizontal spacer.

The horizontal spacer 210 has a bar shape extended horizontally in the embodiment, but shape thereof may be variously changed.

In some cases, the horizontal spacer 210 may have a length variable structure, and in this case, as the length of the horizontal spacer varies, the horizontal spacing between the plurality of installation guide poles 220 may be adjusted.

Each of installation guide poles 220 is provided with a guide body 221 as the center, a cap 222 at an upper part of the guide body and an insertion guide part 223 at a lower part thereof.

The guide body 221 has a shape extended in the vertical direction, and is positioned inside the second unit compartment 121 of the upper caisson block 120.

A cross-sectional shape of the guide body 221 preferably corresponds to a cross-sectional shape of the second unit compartment 121 of the upper caisson block 120. That is, when the cross-sectional shape of the second unit compartment 121 of the upper caisson block 120 has a rectangular shape, the cross-sectional shape of the guide body 221 has the rectangular shape. Likewise, when the cross-sectional shape of the second unit compartment 121 of the upper caisson block 120 has a circular shape, the cross-sectional shape of the guide body 221 also has the circular shape, preferably.

In the embodiment, since the cross-sectional shape of the second unit compartment 121 of the upper caisson block 120 has the rectangular shape, the cross-sectional shape of the guide body 221 has the rectangular shape.

The cap 222 is formed on the upper part of the guide body 221. The cap 222 has a stopping step 222a protruding from a rim of the cap 222.

Therefore, when the guide body 221 is inserted into the second unit compartment 121 of the upper caisson block 120, the stopping step 222a of the cap 222 stops at the upper surface of the upper caisson block 120.

The insertion guide part 223 is formed on a lower part of the guide body 221. The insertion guide part 223 has cross-sectional area gradually decreasing in a downward direction. This shape of the insertion guide part 223 functions to guide the guide body 221 to be easily inserted into the second unit compartment 121 of the upper caisson block 120, and into the first unit compartment for concrete 113 of the bottom caisson block 110.

The above-mentioned cap 222 of the installation guide pole 220 is suspended from the horizontal spacer 210 by means of a cap connecting member 230. This coupling form allows free movement of the installation guide pole 220, which is advantageous.

Meanwhile, a center-to-center length in the horizontal direction of the plurality of installation guide poles 220 coupled to the horizontal spacer 210 is the same as the center-to-center length (L1) in the horizontal direction of the first unit compartments for concrete 113 of the bottom caisson block 110.

That is, the center-to-center length in the horizontal direction of the installation guide poles 220 is the same as L1, and is twice L2.

The horizontal spacer 210 is connected to a lifting part 301 of a crane by the crane connecting cable 240, and maintains its horizontality by the crane connecting cable 240.

3. Forming Bottom Caisson Block Structure

Figure 10:
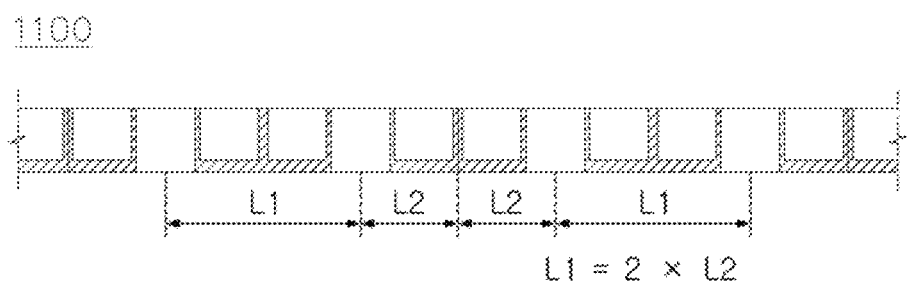
FIG. 10 is a sectional view showing a bottom caisson block structure formed of the bottom caisson block of FIG. 1.
Figure 11:
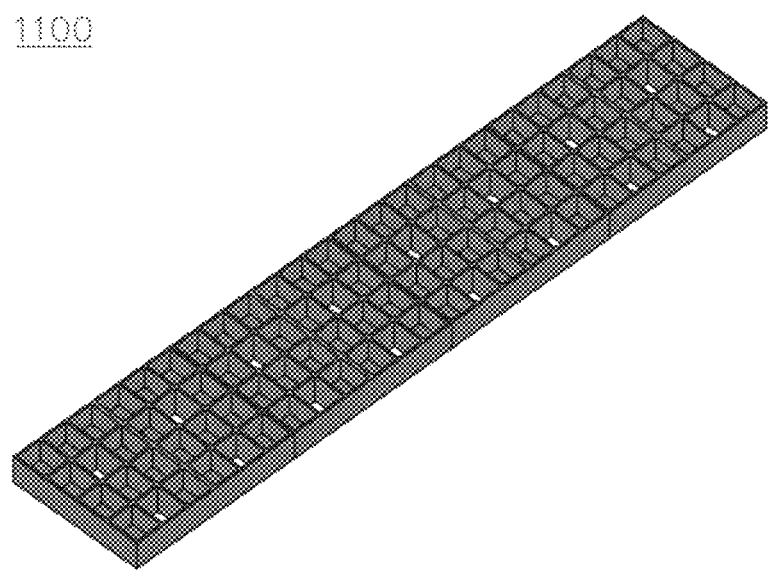
FIG. 11 is a perspective view of the bottom caisson block structure of FIG. 10.

FIG. 10 is a sectional view showing a bottom caisson block structure formed of the bottom caisson block of FIG. 1. FIG. 11 is a perspective view of the bottom caisson block structure of FIG. 10.

The bottom caisson blocks 100 of FIG. 1 are installed to be aligned, thereby forming a bottom caisson block structure 1100.

Each bottom caisson block 110 has the first unit compartment for concrete 113, and the center-to-center length in the horizontal direction of the first unit compartments for concrete 113 of one bottom caisson block 110 (L1) is same as a center-to-center length (2×L2) in the horizontal direction of adjacent first unit compartments for concrete 113 of a pair of bottom caisson blocks 110 adjacent to each other.

The bottom caisson blocks 110 are installed using the through tube for the connecting wire rope or the lifting loop means, and herein, the detailed description of the through tube will be omitted because the technique thereof is described in detail in Korean Patent No. 10-1220995.

4. Placing Upper Caisson Block

Figure 12:
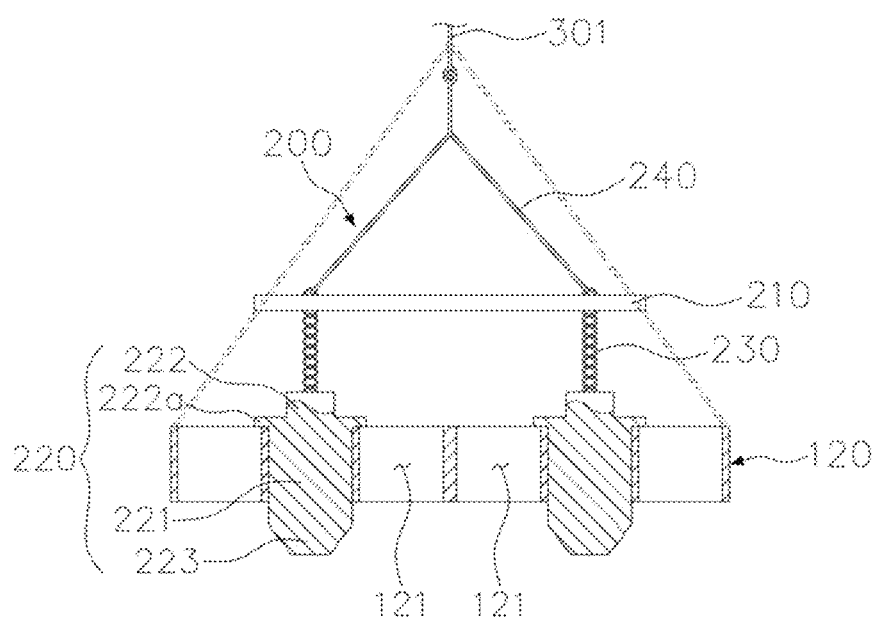
FIG. 12 is a sectional view conceptually showing a state of lifting an upper caisson block subject to be installed.
Figure 13:
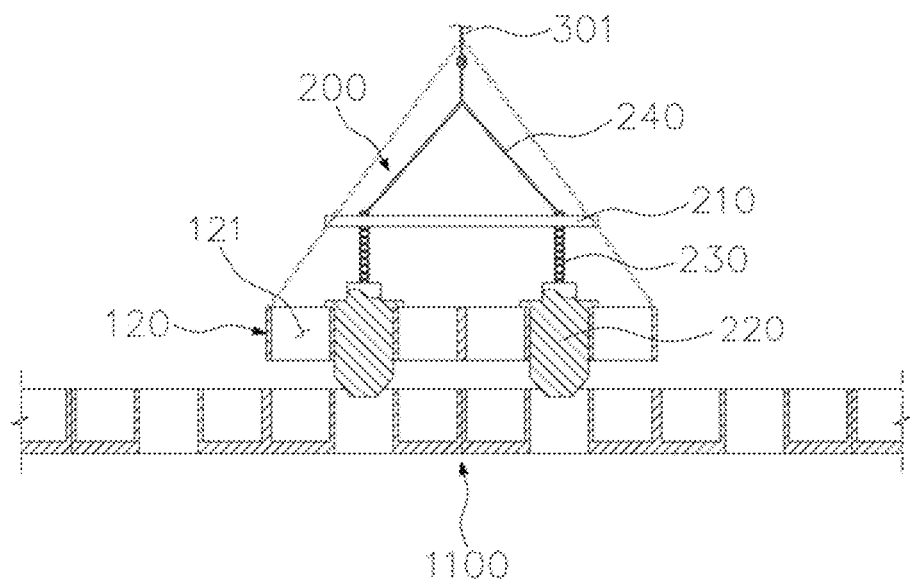
FIGS. 13 and 14 are sectional views conceptually showing a state of placing the upper caisson block subject to be installed on the bottom caisson block structure.
Figure 14:
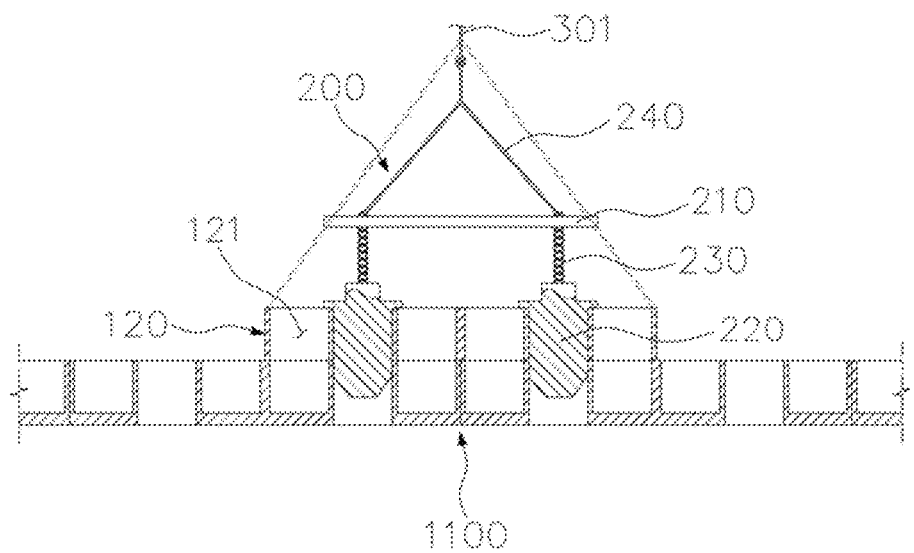

FIG. 12 is a sectional view conceptually showing a state of lifting an upper caisson block subject to be installed. FIGS. 13 and 14 are sectional views showing a state of placing the upper caisson block subject to be installed on the bottom caisson block structure.

First, the installation guide pole 220 of the installation guide member 200 is inserted into a second unit compartment 121 of the upper caisson block 120 subject to be installed.

Here, the cap 222 of the installation guide pole 220 is suspended from the horizontal spacer 210 by the means of the cap connecting member 230, and the insertion guide part 223 of the installation guide pole 220 has a relatively sharp shape on its lower part. Therefore, operation of inserting the installation guide pole 220 into the second unit compartment 121 proceeds very simply.

As described above, the installation guide member 200 is installed in the upper caisson block 120, and then lifts the upper caisson block 120.

That is, the lifting part 301 of the crane is connected to the lifting loop means (not shown) of the upper caisson block 120, and then the lifting part 301 of the crane lifts the upper caisson block 120, as shown in FIG. 12.

When the upper caisson block 120 is lifted, the stopping step 222a of the installation guide pole 220 stops at the upper surface of the upper caisson block 120, the guide body 221 of the installation guide pole 220 is positioned inside the second unit compartment 121 of the upper caisson block 120, and the insertion guide part 223 of the installation guide pole 220 protrudes from a bottom of the upper caisson block 120 subject to be installed.

Meanwhile, in FIG. 12, the installation guide pole 220 is illustrated in a suspended state by the horizontal spacer 210. In practice, however, the installation guide pole 220 is seated in a rested state on the upper caisson block 120, and the horizontal spacer 210 is placed on the upper surface of the upper caisson block 120. That is, the cap connecting member 230 and the crane connecting cable 240 preferably are long enough, so that the cap connecting member 230 and the crane connecting cable 240 are in a sagging state rather than tight state when the lifting part 301 of the crane lifts the upper caisson block 120.

As described above, after lifting the upper caisson block 120 subject to be installed, the upper caisson block 120 subject to be installed is placed on an upper part of the bottom concrete block structure 1100 while being guided by the installation guide pole 220, as shown in FIGS. 13 and 14.

That is, since a lower part of the insertion guide part 223 of the installation guide pole 220 has the relatively sharp shape, operation of inserting the installation guide pole 220 into the first unit compartment for concrete 113 of the bottom concrete block structure 1100 proceeds very simply. Therefore, the installation guide pole 220 is firstly inserted into the first unit compartment for concrete 113 of the bottom concrete block structure 1100, and then the upper caisson block 120 subject to be installed moves downward to an accurate position.

Therefore, as the second unit compartment 121 of the upper caisson block 120 subject to be installed is positioned directly above the first unit compartment 111 of the bottom caisson block 110, the upper caisson block 120 subject to be installed is placed on the bottom concrete block structure 1100.

Although the description describes the case of placing the upper caisson block 120 on the bottom caisson block 110, a case of placing the upper caisson block 120 on the upper caisson block 120 which is already installed is also applied thereto.

Meanwhile, in the embodiment, the upper caisson block 120 is horizontally offset from the bottom caisson block 110. That is, in FIG. 14, a planar position of the upper caisson block 120 is disposed by being laterally spaced from a planar position of the bottom caisson block 110 disposed below the upper caisson block 120. Therefore, the upper caisson block 120 is not disposed directly above the bottom caisson block 110.

Nevertheless, the second unit compartment 121 of the upper caisson block 120 is positioned directly above the first unit compartment 111 of the bottom caisson block 110. That is, a unit compartment with a high position is positioned directly above a unit compartment with a low position.

Such process is also applied to a case in which a upper caisson block 120 is installed on another upper caisson block 120 already installed.

That is, a plurality of caisson blocks 110 and 120 are offset from each other to increase structural coupling performance, while unit compartments communicate to each other in the vertical direction to increase the structural coupling performance by rubble or concrete.

5. Separating Installation Guide Member

Figure 15:
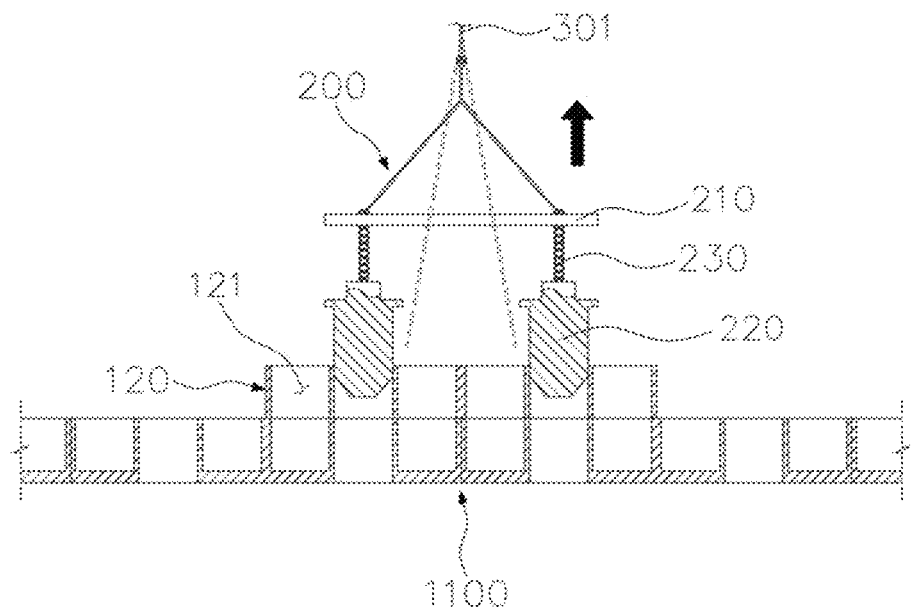
FIG. 15 is a sectional view showing a state of separating a lifting part of a crane from the upper caisson block.
Figure 16:
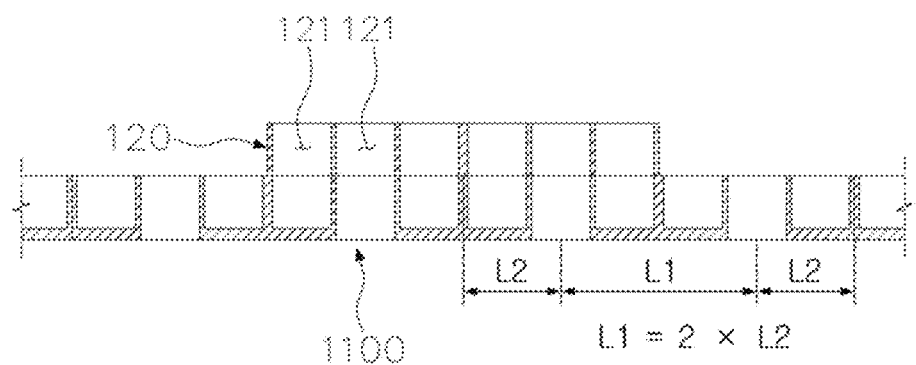
FIGS. 16 and 17 are a sectional view and a perspective view showing the caisson block structure separated from the installation guide member through a process of FIG. 15.
Figure 17:
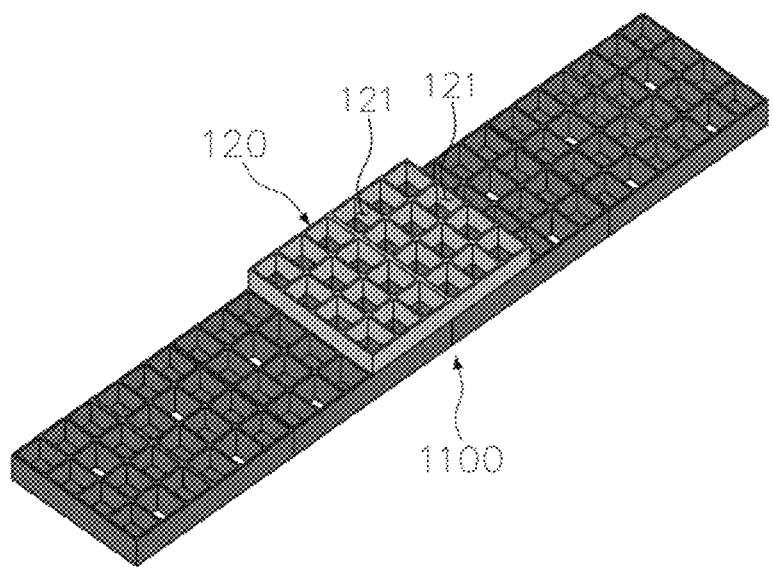

FIG. 15 is a sectional view showing a state of separating a lifting part of a crane from the upper caisson block. FIGS. 16 and 17 are a sectional view and a perspective view showing the caisson block structure separated from the installation guide member through a process of FIG. 15.

As shown in FIG. 14, after the upper caisson block 120 subject to be installed is placed, the installation guide member 200 is separated and recovered from the upper caisson block 120 subject to be installed.

In the embodiment, the installation guide member 200 is connected to the lifting part 301 of the crane by the crane connecting cable 240. Therefore, when the lifting part 301 of the crane is separated from the upper caisson block 120 subject to be installed and moves upward, the installation guide member 200 also moves upward with the lifting part 301 of the crane thereby being separated from the upper caisson block 120 subject to be installed.

Therefore, the separated and recovered installation guide member 200 is again used to lift and place another upper caisson block.

Figure 18:
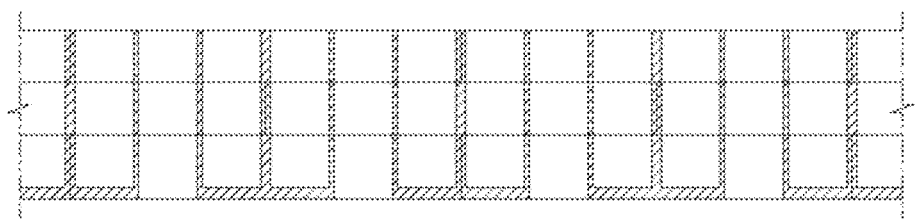
FIG. 18 is a sectional view showing a caisson block structure formed of a plurality of upper caisson blocks by repeating processes of FIGS. 12 to 15.

That is, by repeating steps 4 and 5, a caisson block structure 1000 in three stages may be formed by installing a plurality of upper caisson blocks 120, as shown in FIG. 18.

FIG. 18 is a sectional view showing the caisson block structure 1000 formed of the plurality of upper caisson blocks by repeating processes of FIGS. 12 to 15.

6. Filling with Rubble

Figure 19:
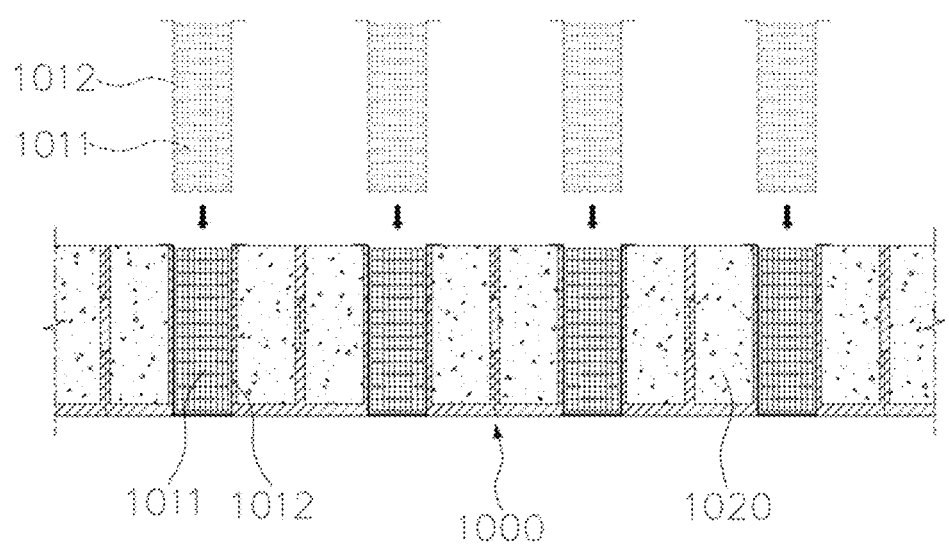
FIG. 19 is a sectional view showing the caisson block structure of FIG. 18 in which rubble and vertical reinforcing bar modules are inserted.

After the state of FIG. 18 is complete, rubble 1020 is inserted into the upper part of the second unit compartment 121 of the upper caisson block 120 which are positioned above the first unit compartment for rubble 112 and exposed upward, as shown in FIG. 19. Then, the rubble 1020 fills vertically from the first unit compartment for rubble 112 to the second unit compartment of the upper caisson block 120 exposed upward, FIG. 19 is a sectional view showing the caisson block structure of FIG. 18 in which rubble and vertical reinforcing bar modules are inserted.

Meanwhile, the filling with rubble may be performed after inserting vertical reinforcing bar module and forming vertical concrete column for joining which are described hereinafter.

7. Inserting Vertical Reinforcing Bar Module

After the state of FIG. 18 is complete, as shown in FIG. 19, a vertical reinforcing bar module 1011 is inserted through the second unit compartment 121 of the upper caisson block 120 positioned above the first unit compartment for concrete 113 and exposed upward.

FIG. 19 is a sectional view showing the caisson block structure of FIG. 18 in which rubble and vertical reinforcing bar modules are inserted.

The vertical reinforcing bar module 1011 may be formed vertically and in a cylinder shape by assembling reinforcing bars. In addition, the vertical reinforcing bar module 1011 may be inserted into the first unit compartment for concrete 113 of the bottom caisson block 110 through the exposed upper part of the second unit compartment 121.

As described above, when the vertical reinforcing bar module 1011 is inserted, the vertical reinforcing bar module 1011 is positioned inside the first unit compartment for concrete 113 and at least one second unit compartment 121 which are disposed consecutively in the vertical direction, as shown in FIG. 19.

In order to solve a problem of water being inside the first unit compartment for concrete 113 and at least one second unit compartment 121 which are disposed consecutively in the vertical direction when the vertical reinforcing bar module 1011 is inserted, the vertical reinforcing bar module 1011 is inserted with the waterproof membrane 1012 covering lower and side parts thereof.

Therefore, since the vertical reinforcing bar module 1011 is inserted in the waterproof membrane 1012, the vertical reinforcing bar module 1011 is completely prevented from exposure to seawater or a saline component.

In addition, when the vertical reinforcing bar module 1011 is inserted with the waterproof membrane 1012, water inside the first unit compartment for concrete 113 and at least one second unit compartment 121 can be discharged through the open lower part of the first unit compartment for concrete 113 of the bottom caisson block 110.

That is, as the first unit compartment for concrete 113 has the open lower part, insertion of the vertical reinforcing bar module 1011 and the waterproof membrane 1012 becomes easy.

If the lower part of the first unit compartment for concrete 113 is not open, it is difficult to discharge the water inside the first unit compartment for concrete 113 and at least one second unit compartment 121 to the outside. In particular, it is extremely difficult to discharge the water inside the first unit compartment for concrete 113, and there is a problem that a vertical concrete column for joining (described hereinafter) is not formed in close contact with the bottom caisson block 110.

Meanwhile, depending on embodiments, a drain pipe for discharging the water inside the first unit compartment for concrete 113 may be temporarily installed and the vertical reinforcing bar module 1011 and the waterproof membrane 1012 are inserted together, so that the inside water is easily discharged through the drain pipe. Here, a pump can be used to forcibly discharge the inside water, but the water can be discharged naturally by the pressure of descent insertion of the vertical reinforcing bar module 1011 and the waterproof membrane 1012. The drain pipe may be removed after the water is discharged.

8. Forming Vertical Concrete Column for Joining

Figure 20:
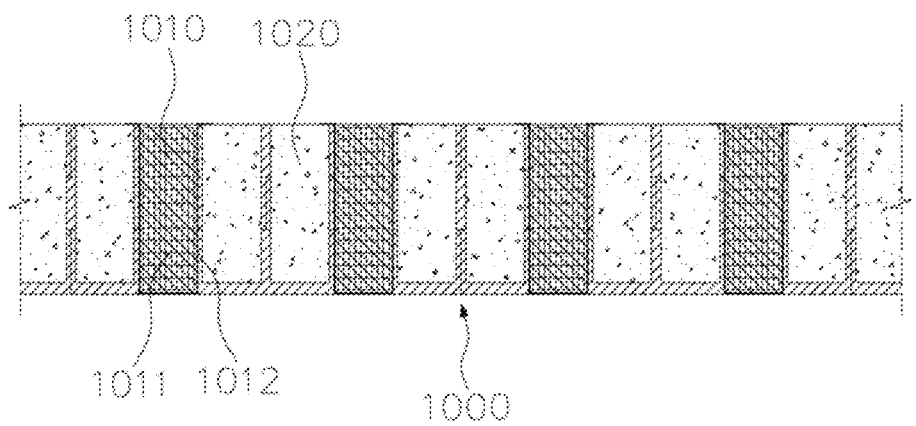
FIG. 20 is a sectional view showing the caisson block structure of FIG. 19 in which concrete is cast to form vertical concrete columns for joining.

FIG. 20 is a sectional view showing the caisson block structure of FIG. 19 in which concrete is cast to form vertical concrete columns for joining.

After the state of FIG. 19 is complete, as shown in FIG. 20, concrete is cast into the upper part of the second unit compartment 121 in which the vertical reinforcing bar module 1011 is inserted, thereby forming the vertical concrete column consecutively along a first unit compartment for concrete 113 and at least one second unit compartment 121 disposed vertically.

Since the caisson block structure 1000 is bound with strong force by the vertical concrete column for joining 1010, thereby having high structural stability, the caisson block structure 1000 is not easily damaged by ocean waves due to a huge typhoon, etc.

As described above, as the bottom caisson block and the upper caisson block are offset from each other, the caisson block structure constructed according to the construction method is firmly joined by the rubble filling and the vertical concrete column for joining.

In addition, the construction method allows the upper caisson block to be seated on the accurate position for being aligned with positions of a bottom caisson block and an upper caisson block disposed below the upper caisson block to be seated. Therefore, the construction of the caisson block can be accurate and the construction speed thereof can be drastically increased.

In addition, the accurate construction of the caisson block can make a very substantial caisson block structure.

Hereinafter, another embodiment of the present invention will be described.

Figure 21:
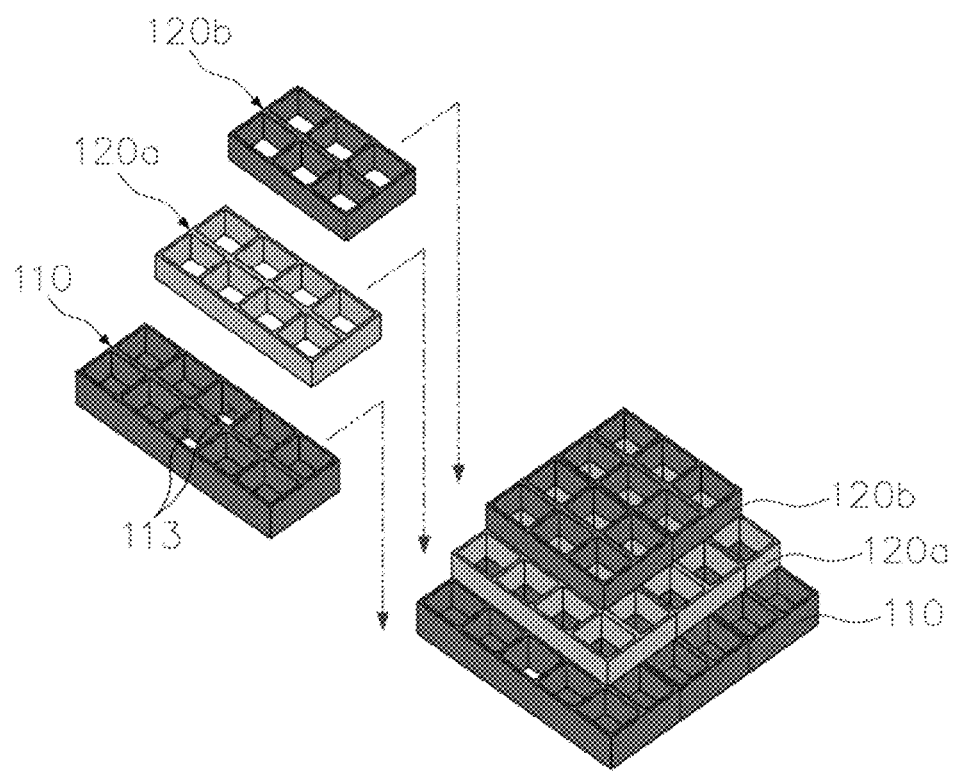
FIG. 21 is a perspective view showing a state in which a bottom caisson block and an upper caisson block are installed according to another embodiment of the present invention.
Figure 22:
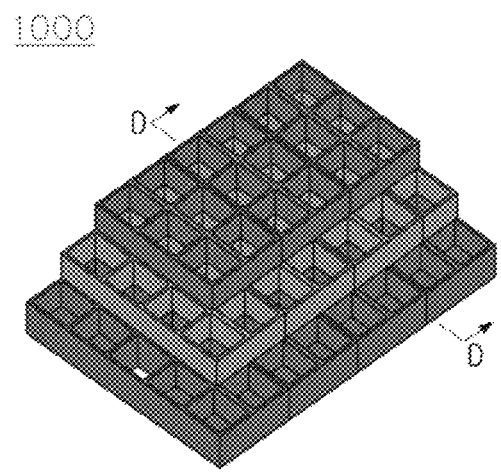
FIG. 22 is a perspective view showing a caisson block structure formed through the process of FIG. 21.
Figure 23:
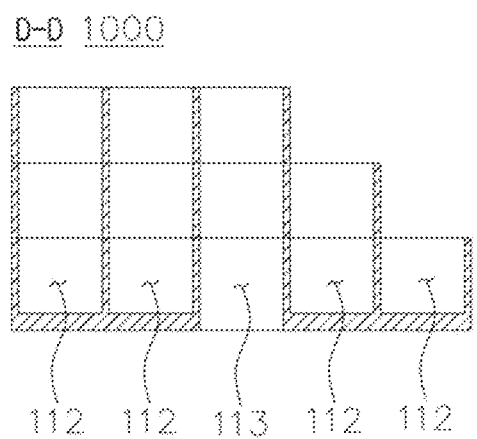
FIG. 23 is a sectional view taken along the D-D line of FIG. 22.

FIG. 21 is a perspective view showing a state in which a bottom caisson block and an upper caisson block are installed according to another embodiment of the present invention, FIG. 22 is a perspective view showing a caisson block structure formed through the process of FIG. 21, FIG. 23 is a sectional view taken along the D-D line of FIG. 22.

The bottom caisson block 110 and upper caisson blocks 120a and 120b are placed like the process of FIG. 21 to form the caisson block structure 1000 of FIG. 22.

As shown in FIG. 23, a first unit compartment for concrete 113 of the bottom caisson block 110 has an open lower part.

Figure 24:
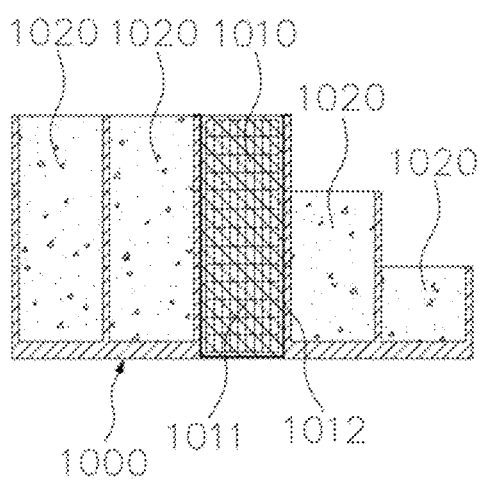
FIG. 24 is a sectional view showing the caisson block structure in which rubble fill and a vertical concrete column for joining is formed, after the process of FIG. 23.
Figure 25:
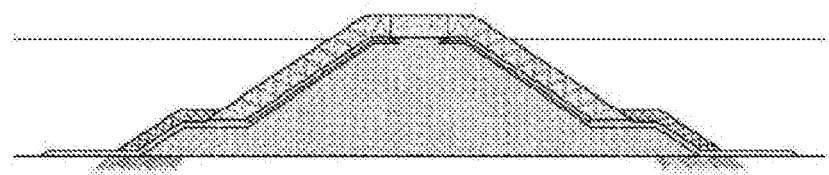
FIG. 25 is a view showing a conventional breakwater.
Figure 26:
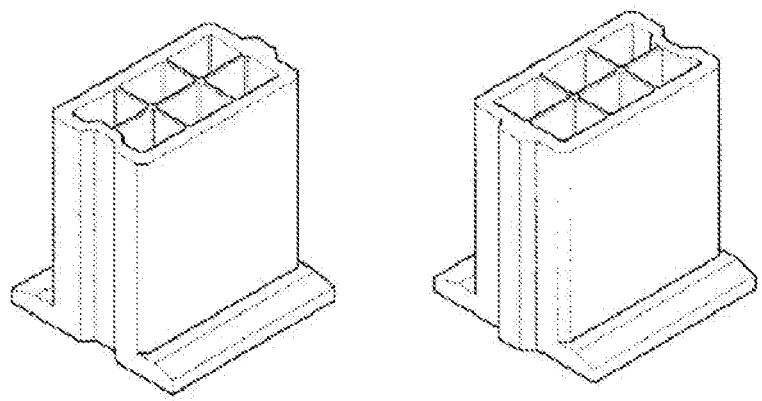
FIG. 26 is a perspective view showing a conventional quay caisson.
Figure 27:
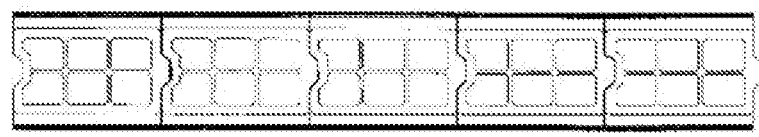
FIG. 27 is a quay constructed using the quay caisson of FIG. 26.

Then the caisson block structure is filled with the rubble 1020 according to the above-described construction method of FIG. 24, and the vertical concrete column for joining 1010 is formed.

FIGS. 21 to 24 are intended to show various embodiments of the present invention, and the bottom caisson block 110 and the upper caisson blocks 120a and 120b can be manufactured in various shapes and also installed in various forms.

Although a preferred embodiment of the present invention has been described for illustrative purposes, and those skilled in the art will appreciate that various modifications, additions and substitutions are possible, without departing from the scope and of the present invention as disclosed in the accompanying claims. Therefore, it should be understood that the embodiment is not limited to the description hereinabove. For example, each components described in a single form may be embodied in a dispersal form, and components as being dispersed may be embodied in a coupled form.

The scope of the present invention is defined by the accompanying claims rather than the description which is presented above. Moreover, the present invention is intended to cover not only the exemplary embodiments, but also various alternatives, modifications, equivalents and other embodiments that may be included within the spirit and scope of the present invention as defined by the appended claims.

The invention claimed is:

1. A caisson block construction method, the method comprising:

manufacturing a plurality of bottom caisson blocks having a plurality of first unit compartments disposed consecutively in a horizontal direction, each of the first unit compartments being classified into a first unit compartment for rubble and having an open upper part and a closed lower part and a first unit compartment for concrete, wherein an upper part of the first unit compartment for concrete is open;

manufacturing a plurality of upper caisson blocks having a plurality of second unit compartments, each of the second unit compartments being disposed consecutively in the horizontal direction and having open upper and open lower parts;

forming a bottom caisson block structure by installing the plurality of bottom caisson blocks side by side in the horizontal direction;

installing the plurality of upper caisson blocks above the installed bottom caisson blocks, by installing the upper caisson blocks such that each of the upper caisson blocks is horizontally offset from the bottom caisson block or the upper caisson block which is installed below the upper caisson block to be installed, and each of the second unit compartments of the upper caisson block is disposed directly above the first unit compartment of the bottom caisson block or the second unit compartment of the upper caisson block which is installed below the upper caisson block to be installed;

filling with rubble the second unit compartment of the upper caisson block positioned above the first unit compartment for rubble and exposed upward, so that the rubble fills vertically from the first unit compartment for rubble to the second unit compartment of the upper caisson block exposed upward, after the upper caisson blocks are installed;

inserting a vertical reinforcing bar module after the upper caisson blocks are installed, by inserting the vertical reinforcing bar module being which is formed vertically and covered by a waterproof membrane on lower and side parts thereof into the upper part of the second unit compartment of the upper caisson block, which is positioned above the first unit compartment for concrete and exposed upward, so that the vertical reinforcing bar module is positioned inside the first unit compartment for concrete and at least one second unit compartment disposed consecutively; and forming a vertical concrete column for joining by casting concrete into the upper part of the second unit compartment in which the vertical reinforcing bar module is inserted, so that the vertical concrete column for joining is formed consecutively along the first unit compartment for concrete and at least one second unit compartment disposed consecutively.

2. The method of claim 1, wherein the first unit compartment for concrete of the bottom caisson block has an open lower part.

3. The method of claim 1, wherein the installing the upper caisson blocks further comprises:
   preparing an installation guide member, the installation guide member including an installation guide pole provided with a guide body having a cross-sectional shape corresponding to the second unit compartment and extended in the vertical direction, a cap formed on an upper part of the guide body and having a stopping step protruding from a rim of the cap, and an insertion guide part formed on a lower part and having a cross-sectional area decreasing gradually along a downward direction;
   after the installation guide pole is inserted in the second unit compartment of the upper caisson block subject to be installed and the upper caisson block subject to be installed is lifted, placing the upper caisson block subject to be installed on the bottom caisson block or the upper caisson block which is installed below the upper caisson block subject to be installed, by inserting the insertion guide part of the installation guide pole into the first unit compartment of the bottom caisson block or the second unit compartment of the upper caisson block which is installed below the upper caisson block subject to be installed, so that the second unit compartment of the upper caisson block subject to be installed is positioned directly above the first unit compartment of the bottom caisson block or the second unit compartment of the upper caisson block which is installed below the upper caisson block subject to be installed, with being guided by the installation guide pole; and
   after the upper caisson block subject to be installed is placed, separating and recovering the installation guide member from the upper caisson block subject to be installed,
   wherein the placing the upper caisson block and the separating and recovering the installation guide member are repeated a plurality of times.

4. The method of claim 3,
   wherein the installation guide member includes a plurality of installation guide poles and a horizontal spacer from which the plurality of installation guide poles are suspended while maintaining horizontal spacing therebetween, and
   a center-to-center length of the first unit compartments for concrete adjacent to each other in the bottom caisson block is twice a length from a side surface of the bottom caisson block to a center of the first unit compartment for concrete horizontally adjacent to the side surface of the bottom caisson block.

5. A caisson block structure constructed by the caisson block construction method of claim 1.

\* \* \* \* \*